Patented Mar. 22, 1938

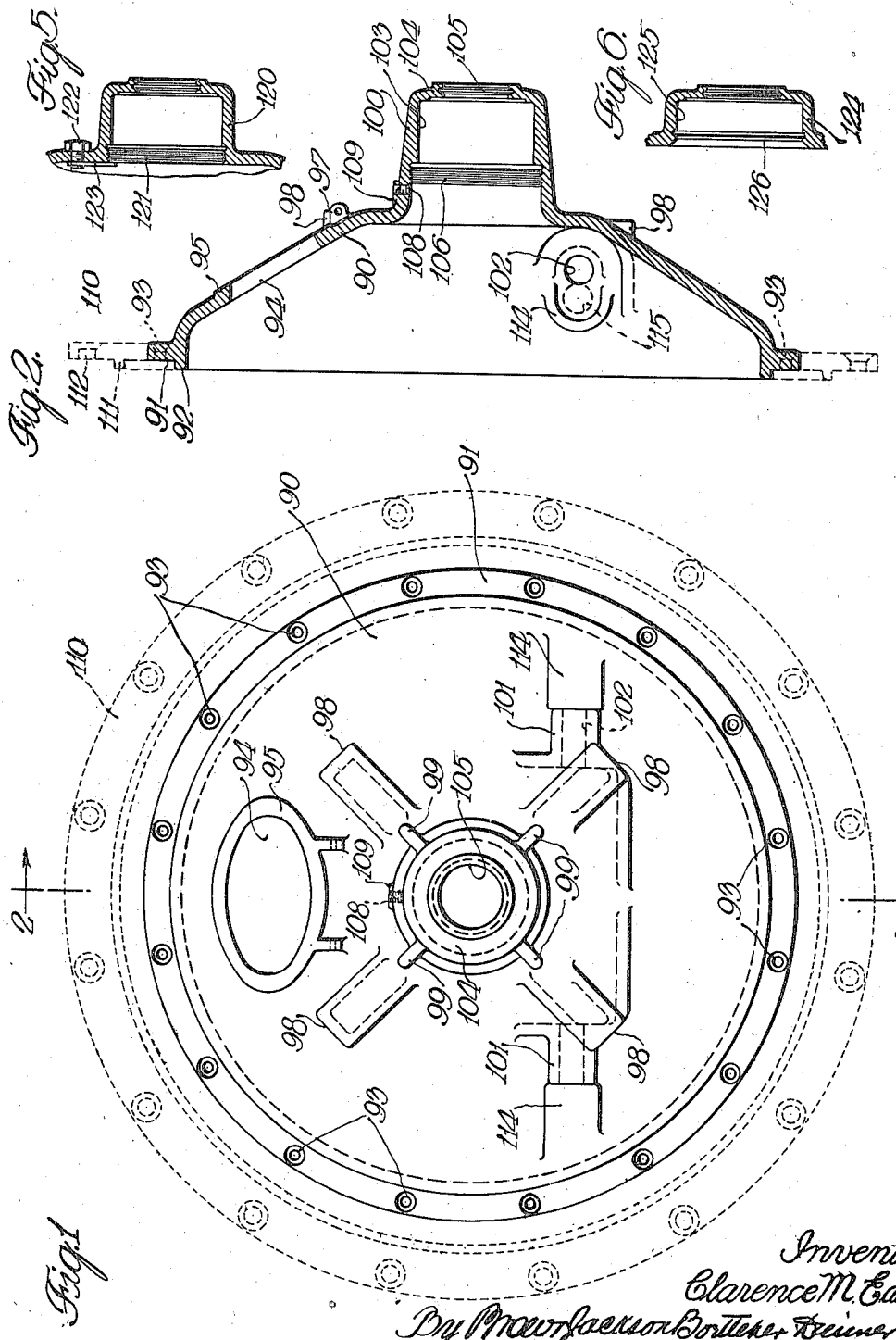

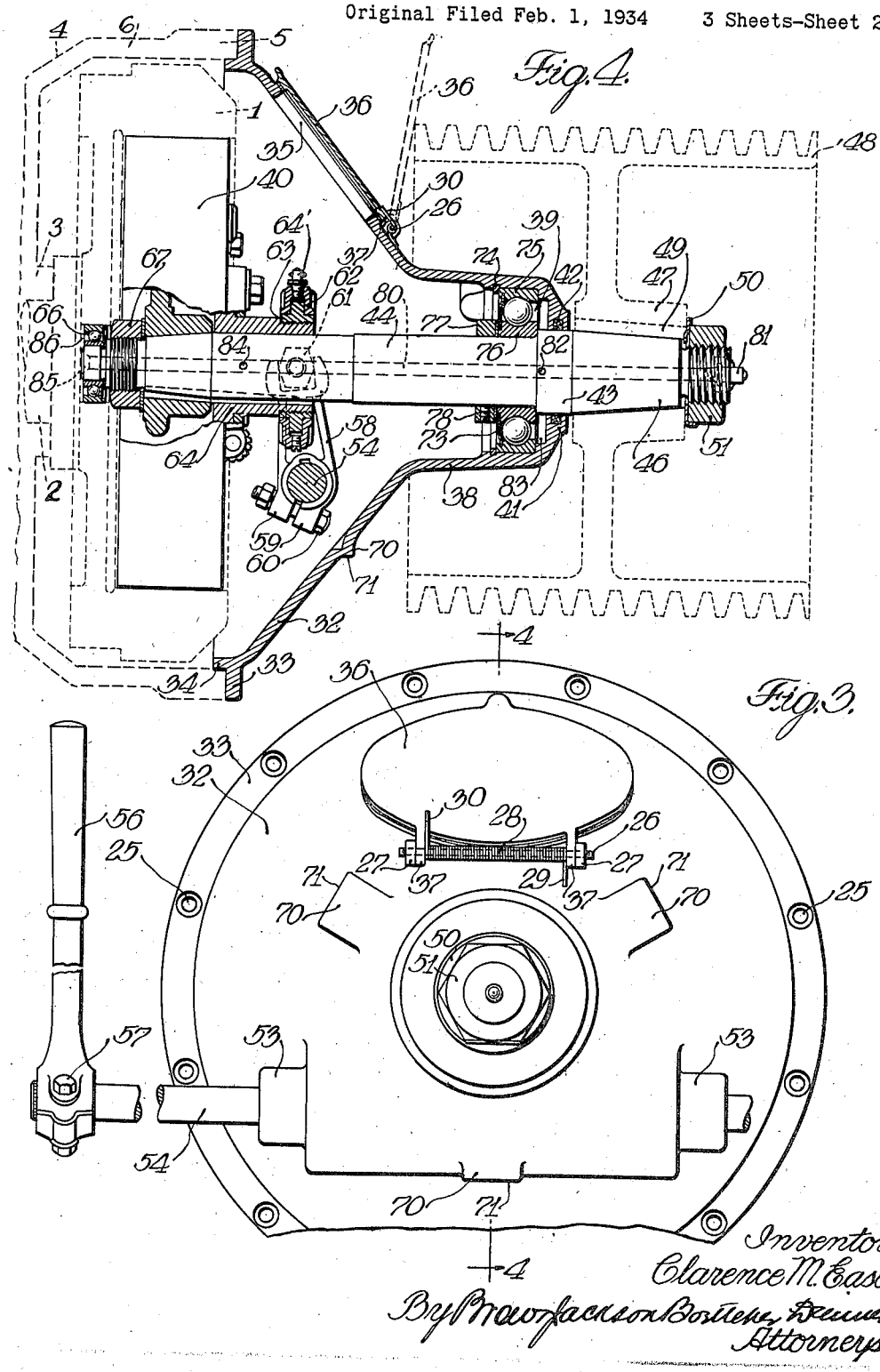

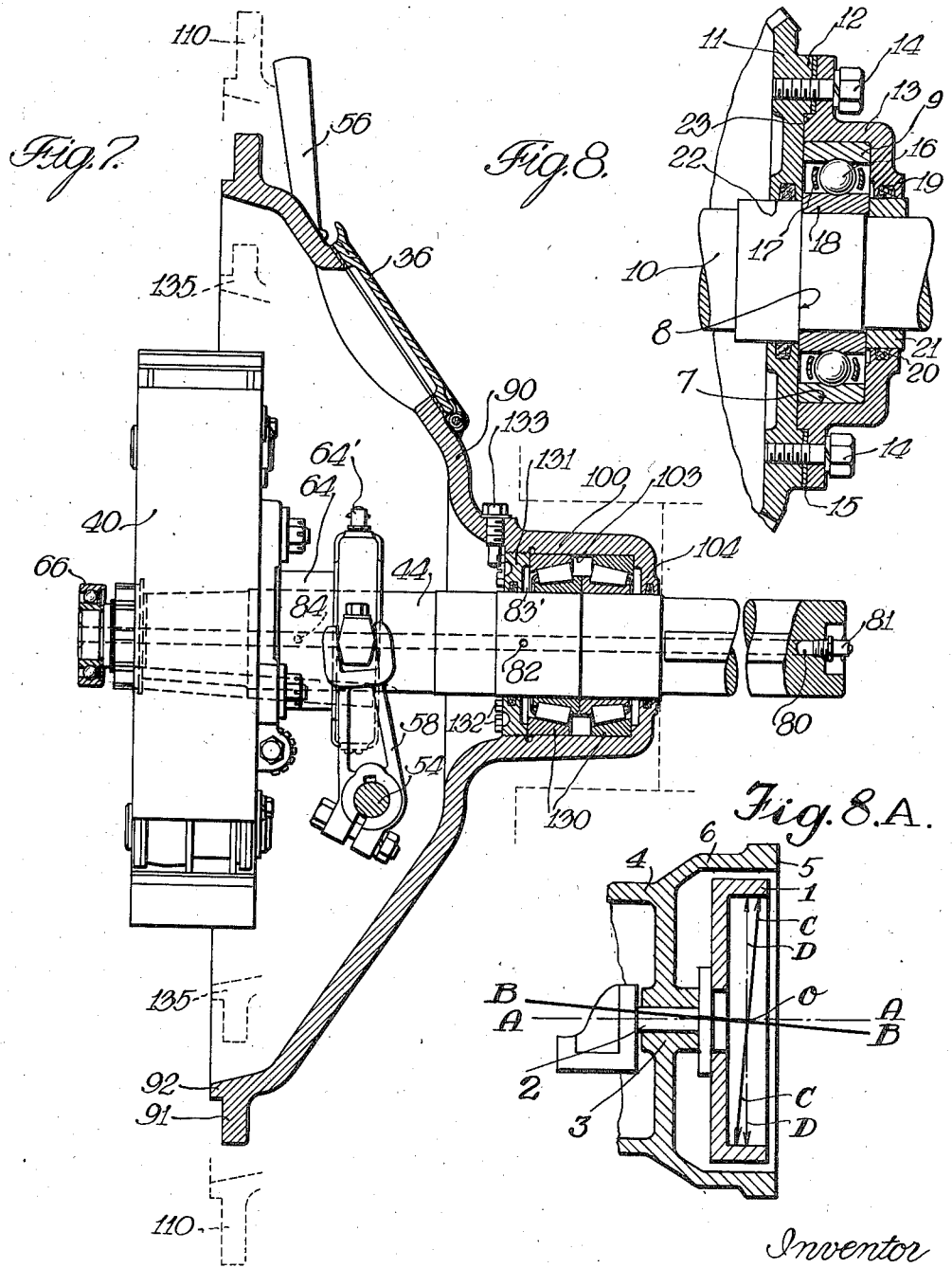

2,111,847

UNITED STATES PATENT OFFICE 2,111,847

POWER TAKE-OFF MECHANISM

Clarence M. Eason, Waukesha, Wis., assignor to Industrial Clutch Company, Waukesha, Wis., a corporation of Wisconsin Substitute application Serial No. 709,278, February 1, 1934. This application March 6, 1937, Serial No. 129,425

2 Claims. (Cl. 74—11)

This invention relates to power take-off mechanisms, and is more particularly directed to mechanisms such as are employed for coupling an internal combustion engine to its load and for uncoupling the same.

In the specific form shown, the power take-off comprises a unitary casting forming a bell or frame member adapted to be attached to the fly wheel housing of the engine and adapted to provide a bearing for a power take-off shaft. This shaft functions as a controllable extension of the engine shaft through use of a suitable clutch. The specific form of the clutch is optional, but a fly wheel clutch is preferable because it is economical of space and material.

The power take-off shaft has a pilot bearing in the engine fly wheel and a main bearing in the bell or frame.

I have found that satisfactory operation of the clutch is dependent upon accuracy of alignment of the engine shaft and the power take-off shaft. If the tolerance of misalignment is kept below a certain value, where the minute give, play or yield of the clutch itself is sufficient to take up the continual flexing imposed by misalignment, the clutch will stand up. If, however, the misalignment involves a displacement which causes an appreciable distortion of the clutch member, the clutch will fail in a remarkably short time, due to destructive wobble plate action caused by such misalignment.

In known forms of power take-off, the tolerances of one manufacturing operation have been superposed upon or multiplied by the tolerances of a second manufacturing operation with the result that such tolerances or permissible errors have been cumulative or magnifying. Hence, in a given lot of power take-offs, manufactured under identical operations, some of the clutches would stand up indefinitely, whereas others would quickly fail. The clutches usually were condemned. Inasmuch as the greatest care had been taken in the manufacture of the clutches and they had, so far as careful inspection could determine, been perfect, the unaccountable failure of seemingly perfect clutches presented a difficult problem.

Persistent research finally disclosed to me the recondite cause of the failure as being in a peculiar combination of circumstances which were bound to occur in the manufacture of the structure of the prior art as above stated.

The broad object of the present invention is to provide a structure which will eliminate the possibility of cumulative or multiplying of errors in the manufacture. This is accomplished by a structure which employs finished surfaces all made coaxial or normal, as the case may be, by virtue of being machined about an axis which is fixed relative to the entire frame or bell. In brief, the structure is such that all lathe operations can be and are performed in one chucking, and can be and are performed on the same side of the casing. This produces what I term "coaxially integrally machining" of these surfaces; that is, integral surfaces of the housing are machined from the same fixed axis without rechucking, and therefore strict coaxial relation of these surfaces is possible without the introduction of any manufacturing tolerances due to repositioning of the axis by rechucking. This eliminates the possibility of cumulative or multiplying errors.

A further object of the invention is to provide a structure which may be supported in such manner as to remove, from the finished surfaces, the distorting effect of chucking or clamping the bell or frame housing in the lathe. This is done by providing integral attaching, clutching or clamping portions remote from the surfaces to be finished and preferably at a point or points where the full strength of the casting or part may be realized.

One of the main advantages of the present invention resides in the provision of a unitary cast housing, which, as will be explained in detail hereinafter, also provides enclosing means for retaining the main bearings of the power take-off shaft in position. In addition, by providing a novel type of pattern having removable bearing noses and flange rings, a plurality of castings can be made from one main pattern and various subcombinations of the supplemental portions thereof.

Another important advantage secured by the present invention is the design of a clutch housing which will allow the mounting of pulleys so that there will be a minimum of overhung load imposed on the unit. The present trend is toward the use of wide multiple-groove V-belt pulleys which have rim widths considerably greater than the length of the hub; usually having the hub off-set. By shaping the housing as herein disclosed, it is possible to mount such pulleys with the overhanging rim portion toward the housing instead of toward the outside as was formerly necessary. Carrying the rim in over the main bearing brings the center line of the load on the pulley closer to the center line of the main bearing, thereby shortening the lever arm supporting the pulley load and reducing the reaction of this load on the clutch and the pilot bearing, due to fulcruming action at the main bearing. An additional advantage simultaneously secured by this construction is the reduction in stress on the fly wheel housing caused by pulley unbalance and belt pull exerted through the moment arm between the mounting flange and the pulley center line. In conjunction with the substantial elimination of misalignment due to the housing construction employed, this provides for considerable reduction of any possible destructive stresses on the clutch parts.

Another feature of the present invention is the provision of a "single shot" lubricating system for use in lubrication of the main bearing, the sliding clutch sleeve, and the pilot bearing externally of the clutch housing. Due to the overhang of the pulley over the bearing nose, it is not feasible to attempt lubrication of the main bearing from the exterior of the bearing nose.

Another feature of the invention resides in the provision of a hand hole opening in the clutch housing provided with a dust-proof closure, and so disposed that a grease gun can be inserted therethrough, to effect lubrication of the clutch yoke. The opening is so disposed that it may be uncovered without interfering with pulleys or the like mounted on the drive shaft.

Other objects and advantages of the present invention will appear more fully in the following detailed description, which, taken in connection with the accompanying drawings, will disclose to those skilled in the art the particular construction and operation of a preferred form of the invention.

In the drawings:

Figure 1 is an end elevation of a clutch housing constructed according to the teachings of my invention;

Figure 2 is a sectional elevational view taken on the line 2—2 of Figure 1;

Figure 3 is an end elevational view of a preferred form of housing for the power take-off mechanism of the present invention showing it applied in position in connection with a manually operable clutching lever;

Figure 4 is a vertical sectional view taken substantially on the line 4—4 of Figure 3, showing the interior detail of the clutch mechanism and the mounting of a pulley or the like on the external portion of the power take-off shaft;

Figure 5 is a detail view of a supplemental type of bearing nose which may be applied to the housing of Figure 2;

Figure 6 is a second detail sectional view of another form of bearing nose which may be incorporated in the housing structure shown in Figures 1 and 2;

Figure 7 is a vertical sectional elevation of a modified form of clutch housing shown in connection with the power take-off shaft and associated clutch mechanism;

Figure 8 is a partial view of a power take-off housing structure showing an external bearing cap for housing the ball-bearing for the drive shaft, illustrative of former methods of finishing bearing surfaces which produced resultant misalignment; and Figure 8A is a diagram illustrating the reasons for the destruction of the clutch employed with the construction of Figure 8.

The present application is a substitute for my copending application, Serial No. 709,278, filed February 1, 1934.

Referring now in detail to the drawings, Figure 8 which shows the construction of a power takeoff according to the prior art will be explained in order to give a clear understanding of this applicant's improvement. This structure comprises in general the power take-off shaft indicated by the reference numeral 10, a clutch housing or the like indicated fragmentarily at 11. The clutch housing is provided with a shoulder 12 upon which a bearing cap 13 is piloted through an annular shoulder 23, the bearing cap 13 being secured to the housing 11 by means of the stud bolts 14, a gasket 15 being interposed therebetween to provide an oil-tight seal.

The bearing cap 13 is internally machined to receive the outer race 15 of a ball-bearing structure comprising the bearing 16, the bearing cage 17, and the inner bearing race 18. The bearing is prevented from moving laterally by engagement of the outer race 9 between the planar surface of the housing 11 and the enclosing end portion 19 of the bearing cap 13. This enclosing end portion is provided with a packing groove adapted to receive packing 20, preferably formed of felt or the like. The inner bearing ring 18 is held loosely on shaft 10 between a shoulder 8 and removable collar 21. This collar 21 cooperates with the lubricant retaining washer of packing 20. This structure is possessed of certain inherent disadvantages. The planar axially facing surface and the cylindrical piloting surface of the shoulder 12 must be machined to cooperate with corresponding separately machined surfaces on the cap 13 in joining these parts together. The cylindrical piloting boss 23 and the adjacent planar surface of the clamping flange of the bearing cap 13 must also be machined to seat within and against the shoulder 12. The interior of the cap 13 must be machined to receive the bearing. The machining of the shoulder 12 both axially and radially must be done from the right side of the housing, while the machining and finishing of the surface of the flange or mouth (like the flange 33—34 of Figure 4) by which the housing is concentrically aligned with and mounted on the fly wheel housing 6 (as shown in Figure 4) of the internal combustion engine to which such a power take-off mechanism is connected must be done from the left hand side of the housing, as viewed in Figure 8. In the manufacture and marketing of power take-offs of the type shown in Figure 8, I found that certain takeoffs would mysteriously fail in a very short period of operation while others stood up indefinitely. In those which failed, the linings and clutch parts would go to pieces for no apparent reason. I increased the size and rigidity of parts and, if anything, that made it worse. The failures were in the clutch parts, but apparently the fault was elsewhere.

I then discovered that within the proportions of power takeoff mechanism of the type referred to in connection with Figure 8, misalignment of the axis of the flywheel with the axis of the take-off shaft or clutch shaft, due to the aforesaid structure and method of machining, will occur in certain cases and this misalignment will be great enough that at the radial distance at which the friction surfaces are disposed, actual slippage of the friction material of the sleeves against the flywheel was taking place. This slippage was due to the wobble of the clutch relative to the flywheel, and so long as misalignment continued, it was unavoidable. The fault was not in the clutch parts, but in misalignment of the two shafts. The observance of manufacturing dimensions was carefully checked and it was found that no deviation whatever from the prescribed dimensions was present in such takeoff wherein the clutch failed. Other takeoffs so made, with identical dimensions and manufacturing methods, stood up indefinitely.

This slippage due to wobble is illustrated in Figure 8A. The axis of the fly wheel 1 and its crank shaft 2 is indicated by the line A—A. The axis of the shaft 10 is indicated by the line B—B.

Since the clutch parts extend at right angles to the axis of the shaft 10 as indicated by the solid line C—C, and the friction surfaces lie within the cylindrical surface of the flywheel 1, it can be seen that for each revolution of the engine, the clutch surface must slip back and forth axially a distance indicated by the ends of the lines C—D in Figure 8A.

Upon studying the structure of the takeoff illustrated in Figures 8 and 8A, I discovered that the occasional takeoff which failed so quickly in use, while constructed accurately to dimensions, was assembled with errors and tolerances cumulatively occurring, which is possible due to the inherent design of the structure. The errors and tolerances which could thus come into conjunction are the following: First, the boss 12 and the mounting flange (such as 91, 92 in Fig. 7) being machined in two independent operations during two different chuckings, may lack not only concentricity, i. e., the axis of revolution of these surfaces may not coincide but lie parallel to each other, but may also lack alignment, i. e., the axes may neither coincide nor even be parallel. Second, the variations in dimensions of machined parts frequently referred to as machining tolerances of the controlling cylindrical surfaces, i. e., internal cylindrical surface 7 of the cap 13, external cylindrical surface of piloting shoulder 23 of the cap, internal cylindrical piloting surface of the circular boss 12, and the external cylindrical surface of the mounting flange (such as 92 in Figure 7) may all occur cumulatively in the assembly of a particular takeoff. Third, the errors of axial misalignment of the machined surfaces on the opposite sides of the bell 11 may occur conjointly with the cumulative errors of maching tolerances.

I also observed that the shorter the distance between the bearings 16 and the plane of the clutch shoes, the greater would be the wobble action produced by a given cumulation of errors or tolerances. I thereupon devised the structure which is the subject matter of the present invention, and upon putting the same into use, I found that I had not only avoided clutch failure, but had greatly improved the life of the clutch and of the takeoff as a whole.

In Figures 3 and 4 I have disclosed a power take-off mechanism embodying the present invention and having the outer or clutch housing 32 provided with an annularly flanged portion 33 adapted to be secured to the fly wheel housing 6 of the crank case 4 of the engine, this flange 33 preferably being provided with a plurality of spaced openings adapted to receive stud bolts 25 for attaching the housing 32 to the fly wheel housing 6 of the internal combustion engine. As shown in connection with this structure, the housing is provided with an extending shoulder portion or cylindrical piloting flange 34 adapted to align the housing with respect to the fly wheel housing of the engine.

The fly wheel housing 6 is a part of the crank case 4 of the engine. The crank case 4 has bearings, such as 3, for supporting the crank shaft 2 concentrically in the crank shaft housing or bell housing 6 to which the takeoff housing 32 is attached and upon which it is piloted. The crank shaft 2 carries the fly wheel 1, and hence the fly wheel is as accurately as it is commercially possible to make it concentric and coaxial with the mouth or rim 5 of the bell housing 6.

The housing 32 is also provided with a hand hole opening 35 which, in this embodiment, is covered by means of the snap cover 36 which is pivotally mounted upon the housing by means of lugs 37 engaging about pivot member 36 carried by upstanding pivotal supports 27 formed integral with the housing 32. A suitable spring member 28 is coiled about the pivot 26, and has one end thereof, indicated at 29, bearing against the outer surface of the housing 32, while the opposite end 30 bears against the cover plate 36, tending to close the same. The cover may thus be opened to the dotted line position shown in Figure 4 when it is desired to provide access to the interior of the housing 32.

Referring now in detail to Figure 4, it will be noted that the housing 32 has an elongated enclosing bearing nose indicated generally at 38, which provides integral mounting means for the main bearing 39. The housing is closed at its outer end by the inturned integral end portion 41, which is grooved to receive suitable packing 42, which embraces the surface 43 of the drive shaft 44. The drive shaft 44, which projects externally of the housing 32, is provided with a tapered portion 46 adapted to receive the hub 47 of a multiple groove pulley 48 or the like, which is keyed by means of the key 49 to the shaft portion 46. By this elongation of the bearing nose, the bearing is located at a greater distance from the clutch, reducing the effect of any misalignment due to the ratio of this distance to the clutch radius.

It is obvious that any desired type of driving means might be secured to the shaft, such as a pulley, gearing, belt drive sprocket or chain drive sprocket members, or the like. Further, the portion 46 of the drive shaft need not be tapered, but it may be made cylindrical, if desired. It is to be noted that the formation of the pulley 48 is such that the center portion of the pulley, or the hub thereof, is disposed substantially adjacent to the main bearing 39 in order that the stresses imposed upon the shaft will be absorbed directly by this bearing without imparting any considerable strain to the pilot bearing and the inner end of the shaft. The pulley is secured in endwise position upon the shaft 44 by means of a lock washer 50 and lock nut 51 threaded upon the end of the shaft, or by any other suitable securing means.

The former practice was to secure the pulley on the shaft in such manner that the main bearing was disposed outside of the peripheral limits of the pulley. The reasons for this are found in the relative speeds of the engine and the driven device. In order to allow the engine to develop its full speed and power without overspeeding the driven device or requiring a driven pulley of unwieldly size and excessive cost, it is necessary to use a pulley of minimum diameter on the power takeoff shaft 44. These pulleys, such as 48 are supplied to the market in certain sizes and dimensions for certain horse power to be transmitted. Hence, it is highly desirable to be able to employ a wide pulley of small diameter. The provision of an integral small diameter nose carrying the bearing 39 allows the utilization of a diameter of pulley smaller than can possibly be employed with any prior construction and this with the advantage of having a standard form of pulley with its center almost or quite in the plane of the bearing. By the provision of the substantial overhang of the pulley, the stresses formerly producing cocking or twisting of the power shaft and consequent radial stresses upon the clutch members and pilot bearing are reduced or eliminated. The ratios of the moment arms from the stress center of the pulley to the main bearing, and from the latter to the clutch members and pilot bearing, are such that there is no appreciable opposite reaction at these latter points. This moment arm relationship also appreciably reduces the stress on the fly wheel housing due to belt pull or pulley unbalance.

Referring again to Figure 3, it will be noted that the housing 32 is provided with a pair of aligned journal members 53 which are adapted to receive a shaft 54 extending transversely therethrough, the shaft 54 having disposed at its outer end the clutch rod or clutch operating member 56 secured to the shaft by means of a split clamp locking engagement indicated at 57. The shaft 54 is thus journaled in the main housing and within the housing is provided with the yoke actuating members indicated at 58 in Figure 4, which are secured in keyed relation to the shaft by means of the split clamp member 59 and the tensioning bolt 60. The upper portions of the yoke operating members 58 are adapted to engage the stud 61 of the clutch yoke 62, which clutch yoke is engageable over a radially flanged member 63 carried by the clutch sleeve 64. In order to provide lubrication of the clutch yoke, so that it may ride properly upon the flanged member 63, a lubricating nipple, indicated at 64', is threaded therein.

The inner end of the drive shaft 44 is reduced in section and is piloted in the bearing 66 carried by the fly wheel of the internal combustion engine. Keyed to the inner end of this shaft is the clutching means 40 which is secured against endwise displacement by means of the lock nut 67 threaded on the inner end of this shaft.

The clutch construction is of the radially expanding type, and is fully disclosed in Patent No. 1,869,097, issued July 26, 1932, to Thomas L. Fawick. The details of this construction can be had by reference to this patent. Suffice it to say that the clutch sleeve 64 is shown in engagement with the driving shaft of the power plant engine, and is slidable outwardly on the shaft 44 to effect disengagement of the clutching mechanism.

Considering now the manner in which the housing 32 is machined on its bearing surfaces in order to provide the proper alignment thereof with the fly wheel housing of the internal combustion engine, and also in order to provide the proper fit for the main bearing 39 and the associated structural parts, I have disclosed in Figure 3 a plurality of chucking bosses indicated by the reference numeral 70, which are formed integral with the housing 32 intermediate the flange 33 and the end 41. The bosses 70 are preferably spaced equidistantly and equiangularly about the center of the housing, and are adapted to present flattened surfaces 71 for engagement with the jaws of a chuck or the like to hold the housing in place during the machining and finishing operations. It is to be understood that any desired type of chucking surface, such as sockets, lugs, or the like, might be provided for this purpose.

By the provision of these bosses the jaws of the chuck are adapted to grip the main housing intermediate the surfaces to be machined thereon, so that no distortion or abnormal stressing of the metal which is actually machined occurs, and the chuck also serves to align the housing in concentrical alignment during all of the finishing operations, since they are all carried on from one end of the housing.

Because of the novel design of the housing of the present invention, since it is characterized as an integral unit structure, all machining operations can be performed with the housing held in one position upon the chuck, and consequently the surfaces contiguous to the flange 33 and shoulder 34 can be machined and finished accurately. Also, the surfaces which hold the main bearing 39, as well as the surfaces engaging the portion 43 of the shaft 44, can be machined in the same operation, and will necessarily be concentrically aligned with the shoulder 34, due to the single position in which the housing is gripped by the chuck during these machining operations. This provides for concentric alignment of all of the machined surfaces of the housing, providing for even wear thereof, and consequently producing a balanced unit which will have much greater life and which will necessitate fewer replacements than units of the prior types, while also serving to maintain the clutch operating mechanism in proper aligned position to provide for even wear thereof. By this construction the errors in alignment are reduced to a point where the wobble plate action is so slight as not to break the grip of the friction surfaces. As long as this grip is not broken no slippage occurs and hence the clutch will stand up satisfactorily.

It will be noted that the main bearing 39 includes a closure member or annulus 73 which is carried by the outer bearing race 75, and which engages over the end of the inner bearing race 76 to retain lubricant within the bearing. A split ring clamping member 74 is disposed in an annular groove formed in the housing 32, and holds the upper or outer bearing race 75 in position against the machined shoulder formed in the interior of the end portion 38 of the housing. The bearing assembly is held in proper position with respect to the shaft 44 and the bearing cam 38 of the housing by means of a collar 77, which is slidable along the shaft 44 and which may be locked in position by means of the set screw 78.

In the embodiment of the invention disclosed in Figures 3 and 4, I provide what is commonly termed a "one-shot" lubricating system, the shaft 44 being drilled axially through the center thereof to provide a lubricating duct indicated at 80. The duct 80 is provided at the outer end of the shaft 44 with a common type of lubricating nipple 81, which is adapted to receive a pressure grease gun or the like. Disposed in alignment with and extending to the surface of the raised portion 43 of the shaft 44 adjacent the shoulder thereof is a lubricant opening indicated at 82, which provides admission of lubricant from the duct 80 into the space 83 adjacent the bearing 39. The duct 82 is of such cross section that it restrains to some extent the passage of lubricant therethrough, whereby only a small portion of the lubricant injected into the duct 80 will pass outwardly into the space 83.

Disposed adjacent the clutch collar 64 and inwardly of the yoke assembly is a second lubricant opening 84, which lubricant opening serves to provide for lubrication of the shaft surface upon which the collar 64 is mounted for sliding movement. This opening is of slightly greater cross sectional area than the opening 82, in order that lubricant flows into contact with the peripheral surface of the shaft at this point. The duct 80 opens by means of the flared end portion 85 thereof, into a passageway 86 adjacent the pilot bearing 66, whereby the remainder of the lubricant in the duct 80 is forced into the pilot bearing member to provide for lubrication thereof. It is thus apparent that lubrication of the main bearing, the clutch sleeve, and the pilot bearing can be effected from the single nipple member 81 disposed externally of the take-off mechanism.

Referring now to the embodiment of the invention disclosed in Figures 1, 2, 5 and 6, a modified type of housing is shown which has less axial extent, but which is constructed according to the same principles as disclosed in connection with Figures 3 and 4. To provide this embodiment, a standard pattern may be supplemented by interchangeable portions to provide a plurality of housing constructions from the same general pattern. Considering the housing as shown in Figures 1 and 2, and indicated by the reference numeral 90, this housing is of the same general construction as shown in Figures 3 and 4, being provided with a radially extending flange portion indicated at 91 and having the shoulder portion 92 extending normal thereto for securing the housing to the fly wheel housing structure of the internal combustion engine. The flanged portion 91 is provided with a plurality of spaced openings 93 adapted to receive stud bolts for securing the housing in position. A hand-hole opening, indicated at 94, is provided having a flat surface 95 which is adapted to receive a closure member corresponding to the closure member 36 of Figure 3. A pair of integrally formed lugs 97 are provided for pivoting the closure member with respect to this opening.

The housing is also provided with a plurality of chucking lugs or bosses, indicated at 98, corresponding to the bosses 70 of Figures 3 and 4, which are spaced equidistantly and equiangularly about the center of the housing. These bosses, in combination with the rib portions 99 carried by the bearing nose indicated generally at 100, are adapted to align the housing in position for chucking engagement in a lathe or the like when machining and finishing of the bearing surfaces and pilot surfaces is to be effected. A pair of aligned journals 101 are provided for receiving a transverse clutch operating shaft, as described heretofore, the shaft opening being indicated at 102 in Figure 2.

Considering now in detail the bearing extension 100, this extension is provided with the internal cylindrical portion indicated at 103, which is adapted to receive the bearing structure, and is provided with the enclosing end portion 104 having an opening 105 therein for receiving the shaft, the opening 105 fitting about the shaft as shown in Figure 4. Interiorly of the portion 100 of the housing and at the end of the cylindrical bearing receiving portion 103 is a threaded portion, indicated at 106, which is adapted to receive a bearing retaining member threaded therein, the retaining member being held in position by means of engagement of a locking screw threaded through the opening 108 in the boss portion 109 formed on the upper part of the housing. The screw is adapted to engage with lugs formed in the retaining member, and will be described in detail hereinafter.

Referring again to the flange 91, I have shown in dotted lines in Figures 1 and 2 one manner in which a clutch housing for a stationary engine having a larger fly wheel housing opening may be provided. Thus, by providing the pattern from which the casting 90 is made with a supplemental outer ring member, indicated in dotted lines at 110 in Figures 1 and 2, a casting can be made having a greater flange diameter, and from this casting the shoulder 111 may be formed in the same manner as described in connection with the shoulder 92. The supplemental ring 110 will also have the stud openings 112 for reception of attaching studs or the like. It is to be understood when a casting having this greater flange diameter is desired that the portion shown at 110 will be cast integral with the basic housing structure 90, although it is shown in dotted lines in the illustration. Thus, with a basic pattern for casting the housing 90, two different flange diameters may be provided by providing the pattern with the supplemental ring which will produce the housing having the flange 110.

As shown in detail in Figure 2, the housing may also be provided with supplemental means indicated at 114, which will provide a shaft opening 115 for the transverse clutch operating shaft, if a smaller type of clutch is used than that which is operated by a shaft extending through the opening 102. This provides for application of this type of housing to serve different types of clutch construction.

Considering now Figures 5 and 6, it will be noted that the housing 90 can also be provided with different types of bearing noses, which may be supplemented in the basic pattern from which the housing is cast by providing different patterns attached to the basic pattern. For example, in Figure 5 I have shown a bearing nose, indicated by the numeral 120, which is of less axial extent than the bearing nose 100 shown in Figure 2. This bearing nose will accommodate a smaller type of tapered bearing member, and is of the same general construction as that shown in Figure 2, except that in this instance the axial extent is such that different means must be provided for holding the bearing retaining member which is threaded into the inner end of the bearing nose, as shown at 121 in Figure 5, from rotation. This is accomplished by providing a threaded opening in the radially extending surface adjacent the bearing nose which is adapted to receive a stud bolt 122, which stud bolt retains, at its inner end, a locking member 123 adapted to engage spaced lugs on the retaining member for holding the member in position. Thus, if the pattern which provides the bearing nose 120 is applied to the basic pattern for the unitary housing 90, a bearing nose of this form will be provided in the cast housing instead of the bearing nose 100. Thus a smaller size of tapered roller bearing member may be provided therein when the power take-off shaft is of a size such that the larger type of bearing is not required.

In Figure 6 another form of bearing nose is provided which corresponds generally to the type shown in Figures 3 and 4, in that the end portion of the housing is provided with a smaller bearing receiving portion, indicated at 125, for the reception of a ball-bearing member, the bearing nose 124 in this instance being provided with an annular groove 126 adapted to receive a ring member for securing the bearing means in position, which cooperates with a sliding collar on the drive shaft for accomplishing this purpose. As pointed out in connection with Figure 5, the basic pattern for the housing 90 can be provided with any of the supplemental types of bearing nose patterns to produce a unitary housing having any one of the structures shown. Thus, six different clutch housings can be provided from the single basic structure indicated by the housing 90, since each of the housings indicated at 90 and provided with either the flange ring 91 or the flange ring 110 can be also provided with any one of the three bearing noses shown in Figures 2, 5 and 6. This is of the distinct advantage in maintaining manufacturing costs at a minimum.

Figure 7 shows a housing of the type shown in Figures 1 and 2 provided with the power take-off shaft and associated clutching mechanism, together with the main bearing for the shaft. Similar reference numerals will be employed to designate similar parts of the housing structure. Thus the housing 90 is provided adjacent its bearing end 100 with a pair of tapered roller bearing members indicated at 130, which are retained in position by means of the threaded retaining member 131 having a plurality of spaced lugs 132 at the inner end thereof. A stud bolt 133 is threaded into the opening 108 and engages between the spaced lugs 132 to hold the retaining member 131 in bearing engaging position. The clutch mechanism for the power take-off is the same as described in connection with Figure 4, and is indicated by the reference numeral 40.

The power take-off shaft corresponds to the shaft 44 shown in Figure 4, and is provided with substantially the same type of clutching sleeve and yoke operating members, these members being designated by similar reference numerals throughout. It will be noted that the lubricant duct 80 extending through the shaft 44 is provided with an opening 82 communicating with the space 83' formed between the bearing retaining member 131 and the tapered roller bearing structure. Lubricant therefore enters the space 83' and from there is conveyed into the cylindrical portion 103 of the bearing nose 100 to lubricate the roller bearing 130. In dotted lines adjacent the flange 91 is shown the supplemental flange 110 as described in detail in connection with Figures 1 and 2, and a second supplemental flange 135, which may be provided in certain instances.

Considering Figure 4 in detail, it will be noted that the hub of the pulley 48 is adjacent to the bearing 39 and that the distance from the bearing to the hub of the pulley is considerably less than the distance from the bearing 39 to the pilot bearing 56. Thus, the strain upon the pulley is transmitted to the hub at a point closely adjacent the bearing, and no substantial stress is transmitted to the pilot bearing 66. The same is true of the construction shown in Figure 7, the pulley being mounted at such a distance from the bearing 130 that substantially no lateral thrust is imparted to the pilot bearing 66. This increases the life of the bearing members and also prevents any distorting of the clutch members, thus increasing the life of the clutch. The extension of the bearing location under the pulley and the overhang of the pulley inwardly, as provided by the present housing, eliminates the clutch failures, bearing failures and housing failures heretofore encountered.

By the provision of a unitary housing, with chucking lugs provided as shown, it is possible to machine effectively all of the surfaces that need be finished in such a housing from one side thereof and in one chucking operation, whereby strict coaxial alignment of the surfaces is secured. Further, the stresses incident to the chucking operation are imparted to the housing intermediate the surfaces being finished, so that no distortion of these surfaces is effected.

While modifications and changes may be made in the particular design and construction of the power take-off mechanism shown herein without departing from the invention, I do not intend to be limited to the exact details shown and described, but only insofar as defined by the scope and spirit of the appended claims.

I claim:

1. In combination with an engine fly wheel and the concentric bell housing therefor, of a generally conical takeoff housing comprising two coaxial machined surfaces the first being the piloting surface for piloting the large end of the conical housing to the bell housing of the engine, the second being a bearing seat at the small end of the conical housing, these two surfaces being accessible from the large end of the conical housing for machining on the same fixed axis, a takeoff shaft having at its inner end a pilot bearing in the fly wheel and having a main bearing supported and aligned coaxially on said second machined surface, and a releasable friction clutch comprising an element carried on the takeoff shaft and being disposed in a plane at right angles to said shaft, said element and said fly wheel having parts provided with coacting friction surfaces for transmitting the power of the engine from the fly wheel to the take off shaft, the said friction surfaces being disposed at a substantial distance radially from the axis of the fly wheel and of the shaft respectively, the alignment of the shaft and of the fly wheel maintained by said two machined surfaces keeping the wobble plate action of the two parts which are provided with friction surfaces at all times substantially below the point of producing slippage when the clutch is engaged.

2. A power takeoff for use with an internal combustion engine having a crankshaft carrying a flywheel and a bell housing coaxial with the flywheel, said takeoff comprising a takeoff housing consisting of a generally conical portion terminating at its central part in a generally tubular portion the takeoff housing having two coaxially machined surfaces, the first being a piloting surface for piloting the large end of the conical portion upon the bell housing of the engine, the second being a bore within the tubular portion providing a main bearing seat, these two coaxially machined surfaces being accessible from the large end of the takeoff housing, a takeoff shaft having at its inner end a pilot bearing adapted to be disposed coaxially of the flywheel and having intermediate its ends a main antifriction bearing supported and aligned in the bearing seat of the bore of the tubular portion said takeoff shaft projecting through said tubular portion, the tubular bore being of greater axial length than the axial length of the antifriction bearing, a bearing retaining member disposed in said bore and being removable from the large end of the takeoff housing, and connecting means for transmitting the power of the engine between the flywheel of the engine and the takeoff shaft, said means comprising a releasable friction clutch, said clutch comprising an element carried by the takeoff shaft and being rotatable in a plane at right angles to the axis of said takeoff shaft, said two coaxially machined surfaces maintaining the alignment of the axis of the shaft with the axis of the flywheel sufficiently accurate that the wobble plate action is below that which would limit the life of the clutch under load.

CLARENCE M. EASON.